United States Patent [19]

O'Hair et al.

[11] Patent Number: 4,646,575
[45] Date of Patent: Mar. 3, 1987

[54] ULTRASONIC FLOWMETER

[75] Inventors: John G. O'Hair; Michael E. Nolan, both of London, England

[73] Assignee: British Gas Corporation, London, England

[21] Appl. No.: 882,437

[22] Filed: Jul. 7, 1986

Related U.S. Application Data

[63] Continuation of Ser. No. 801,372, Nov. 21, 1985, abandoned, which is a continuation of Ser. No. 608,410, May 9, 1984, abandoned.

[30] Foreign Application Priority Data

May 11, 1983 [GB] United Kingdom ............. 8312989

[51] Int. Cl.⁴ .............................................. G01F 1/66
[52] U.S. Cl. .................................................. 73/861.31
[58] Field of Search ..................... 73/861.27, 861.31

[56] References Cited

U.S. PATENT DOCUMENTS

| 3,940,985 | 3/1976 | Wyler | 73/861.31 |
| 4,078,428 | 3/1978 | Baker et al. | |
| 4,102,186 | 7/1978 | Brown | 73/861.31 X |
| 4,103,551 | 8/1978 | Lynnworth | 73/861.27 |
| 4,162,630 | 7/1979 | Johnson | |
| 4,300,401 | 11/1981 | Pedersen | |

FOREIGN PATENT DOCUMENTS

| 0012058 | 6/1980 | European Pat. Off. |
| 53-68275 | 6/1978 | Japan |
| 8001836 | 9/1980 | World Int. Prop. O. |
| 1264970 | 12/1972 | United Kingdom |
| 1534114 | 11/1978 | United Kingdom |
| 1554564 | 10/1979 | United Kingdom |
| 2026165 | 1/1980 | United Kingdom |
| 1597977 | 9/1981 | United Kingdom |

Primary Examiner—Charles A. Ruehl
Attorney, Agent, or Firm—Larson and Taylor

[57] ABSTRACT

Apparatus for the measurement of fluid flow, particularly flow rates for compressible fluids, comprises at least four transducer sources of ultrasonic energy arranged in fluid conduit system and adapted to project a beam of ultrasonic sound to corresponding receivers, the paths defined by the beams being angularly disposed with regard to both the fluid flow and each other, and being arranged in an intersecting but spaced-apart relationship.

21 Claims, 14 Drawing Figures

TRANSDUCER B

TRANSDUCER A

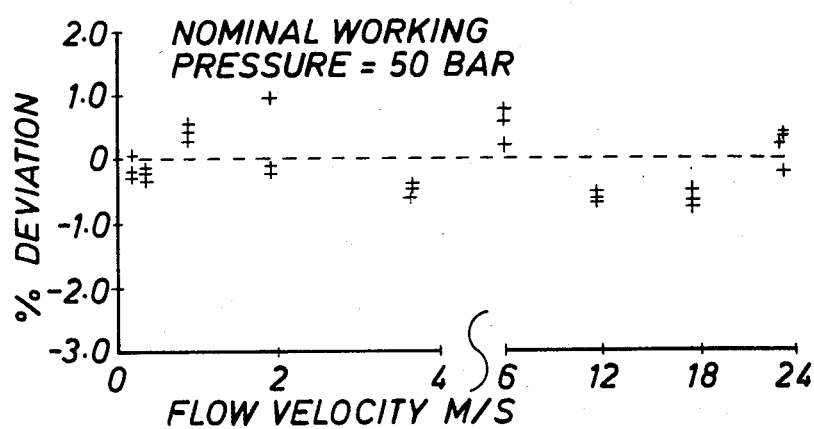
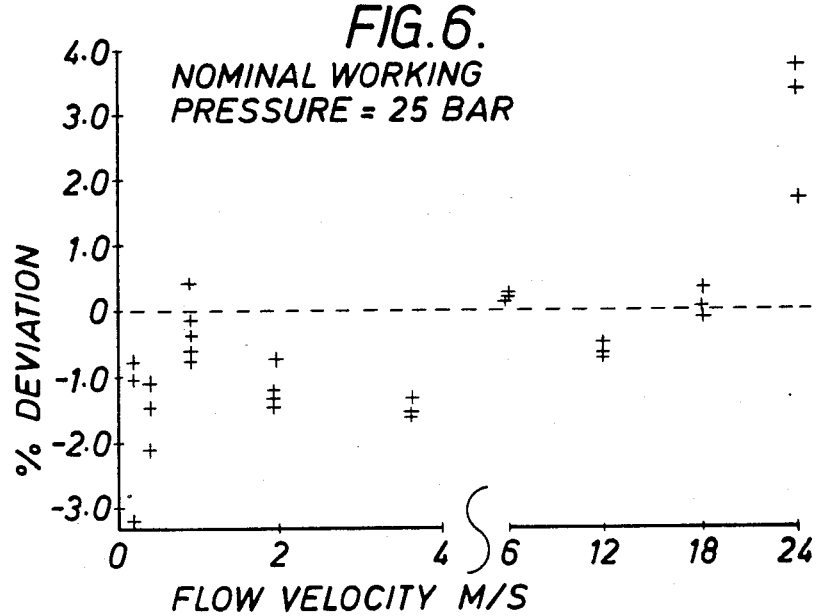

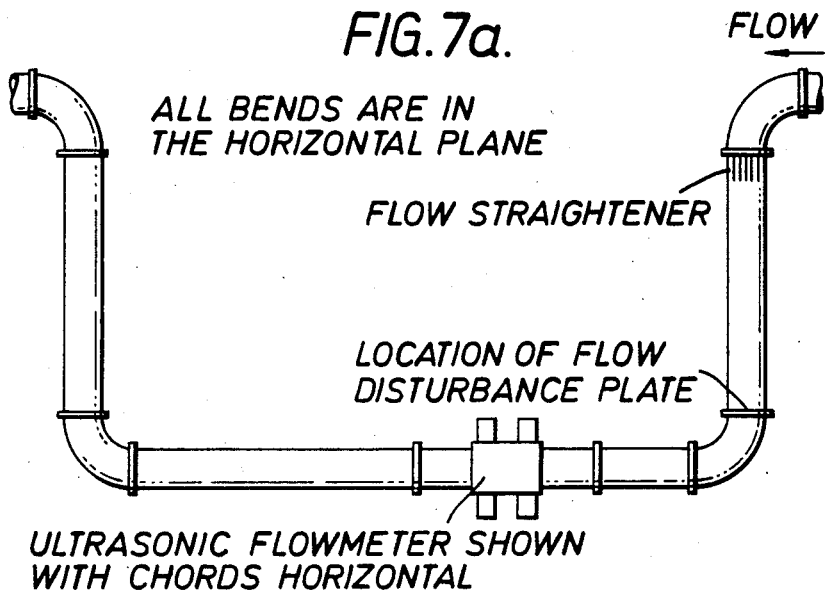
FIG. 7a.
ALL BENDS ARE IN THE HORIZONTAL PLANE
FLOW
FLOW STRAIGHTENER
LOCATION OF FLOW DISTURBANCE PLATE
ULTRASONIC FLOWMETER SHOWN WITH CHORDS HORIZONTAL
FIG. 7b.
VIEW OF FLOW DISTURBANCE PLATE
FOR "JETTING"
TOP
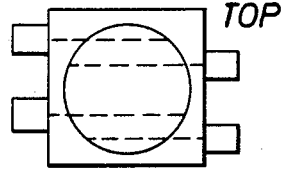
CHORDS HORIZONTAL
TOP
FIG. 7c.
FOR "SWIRL"
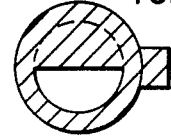
TOP
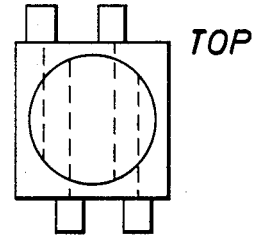
CHORDS VERTICAL
TOP

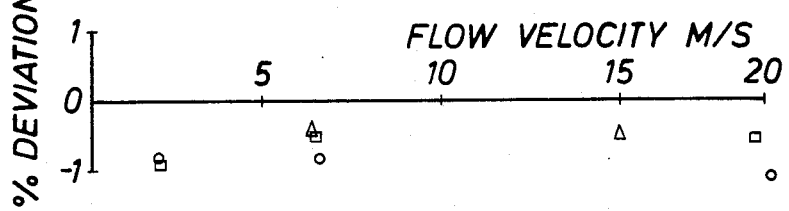
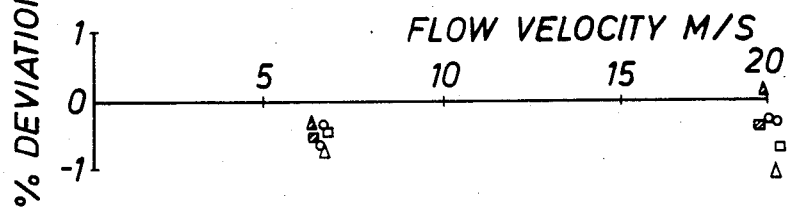
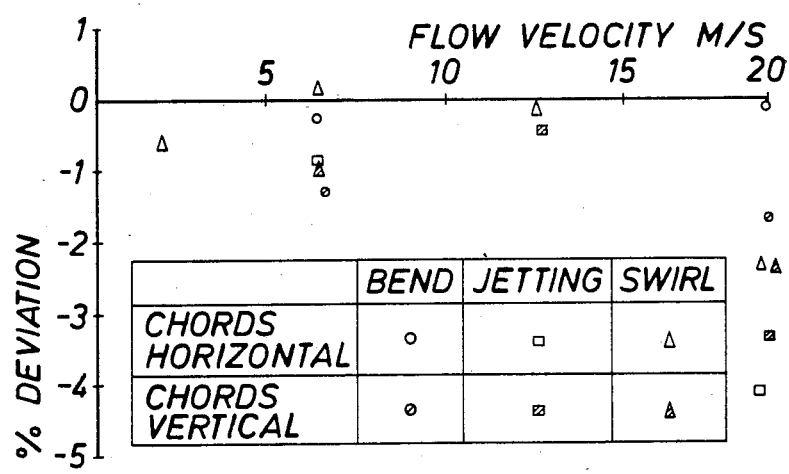

ULTRASONIC FLOWMETER

This application is a continuation of application Ser. No. 801,372 filed Nov. 21, 1985 which is in turn a continuation of Ser. No. 608,410, filed May 9, 1984, both now abandoned.

This invention relates to the measurement of gas flow rates and to apparatus therefor.

With the advent of off-shore gas supplies it is necessary to provide an extensive network of transmission pipelines in order to distribute the gas, operating at a pressure ranging from 40 to 70 bar.

At present the majority of the flow metering needed to operate this system effectively is being done using orifice plate meters. However, there are some serious disadvantages with these meters, including their limited flow range (about 10:1), the pressure drop they cause, the need for long straight meter runs and the substantial maintenance required.

A number of alternatives to the orifice plate meter have been considered. Rotary displacement meters are expensive and have moving parts which could seize up and block the supply. Turbine meters are also susceptible to wear and need individual calibration for accurate use. Vortex meters have a much better turn-down ratio than orifice plate meters but require similar installation conditions and create a similar pressure drop. Only ultrasonic sound-based methods seem to offset the prospect of an almost ideal flow meter for the measurement of gas flow-rates.

The possibility of using sound waves to measure fluid flows has been appreciated for a long time but the methods have only been applied commercially since the early 1960's. Since then a number of different techniques have been developed, but most are only applied commercially to the metering of liquids.

The requirement of a gas transmission supply system is to meter clean high pressure gas flows. This rules out all the Doppler-based methods immediately because they require discontinuities in the fluid to scatter the sound waves. No suitable discontinuities are present in gas flows even at high pressures. The need for high demonstrable accuracy means that the ultrasonic cross-correlation techniques must be rejected. The two most important methods remaining both use the transit of ultrasonic pulses in different directions along one or more diagonal paths across the pipe. In a first method two independent streams or pulses are transmitted in opposite directions. Each pulse is emitted immediately after the previous one in that stream has been detected. The difference between the pulse repetition frequency in the different directions is measured and is a function of the gas velocity. The alternative method is more fundamental and involves the measurement of the transit times directly.

Ultrasonic flow meters also split into two groups with respect to transducer siting, namely wetted and non-wetted (including "clamp on" types). Liquid flow meters are available commercially with "clamp on" transducers. However, it is much more difficult to couple ultrasound into gas than into liquids, and for this reason transducers immersed in the gas offer a partial solution. This minimizes the loss of signal at interfaces and eliminates possible problems caused by beam refraction.

The general arrangement of a simple ultrasonic flow meter of this type is shown in FIG. 1 of the accompanying drawings. The time taken for ultrasonic pulses to travel between the two transducers is measured electronically, for example by using a high frequency clock. The clock is started when the pulse is emitted from one transducer and is stopped at the beginning of the received signal from the other transducer.

In FIG. 1 the sound travelling from A to B is speeded up by the component of the gas flow along its path, so its mean velocity is $c+v(X/L)$ where v is the mean flow velocity of the gas between the probes, c is the velocity of sound, L is the distance between each transducer and X is the longitudinal displacement between the opposed transducer pair.

Thus $$\frac{1}{t_{AB}} = \frac{c + \bar{v}(X/L)}{L} \tag{1}$$

where $t_{AB}$ is the transit time from A to B. Similarly, pulses travelling in the opposite direction are slowed by the component of the gas flow, so $$\frac{1}{t_{AB}} = \frac{c - \bar{v}(X/L)}{L} \tag{2}$$

Subtracting we get $$\frac{1}{t_{AB}} - \frac{1}{t_{BA}} = 2\bar{v}\frac{X}{L^2} \tag{3}$$

or $$\frac{t_{BA} - t_{AB}}{t_{AB} t_{BA}} = 2\bar{v}\frac{X}{L^2} \tag{4}$$

Rearranging gives $$\bar{v} = \frac{L^2}{2X} \frac{\Delta t}{t_{AB} t_{BA}} \tag{5}$$

where $\Delta t = t_{BA} - t_{AB}$ (6)

It can be seen from equation (5) that the mean fluid velocity between the probes is a function only of the measured times and the geometry of the measuring section which cannot change significantly. Fluid properties (composition, temperature, pressure and velocity or sound) have no direct effect on the accuracy of metering, unless they cause the signal to become too weak to trigger the timing circuits properly. In the practical operation of the system there are, inevitably, some additional factors, but they are not very important.

The major limitation inherent in equation (5) is that it relates only to the mean gas velocity between the transducers. Measurements on a diameter, for example, give too much weight to fluid in the centre of the pipe and are therefore usually too high. A single measurement of this type can be related to the mean flow in the pipe only if the fluid velocity distribution across the pipe section is known or can be predicted. It is only possible to predict the velocity distribution sufficiently accurately for this purpose if the flow through the meter is fully developed. This can only be ensured by using long lengths of straight pipework, which in turn requires large sites and therefore is relatively expensive. We have now found that these problems can be obviated if measurements are taken on several different paths across the pipe.

This finding is the more surprising since although the majority of ultrasonic flow meters marketed to date have been designed for use with liquids, one commercially available instrument is available for gas measurement above 3 bar. This instrument, however, is a single path instrument.

Apparatus for the measurement of fluid flow, particularly flow rates for compressible fluids, comprises at least four transducer sources of ultrasonic energy arranged in fluid conduit system and adapted to project a beam of ultrasonic sound to corresponding receivers, the paths defined by the beams being angularly disposed with regard to both the fluid flow and each other, and being arranged in an intersecting but spaced-apart relationship.

A number of different mathematical procedures are available for defining the optimum positions for the multiple measuring paths. One known technique which is a mathematical integration technique known as the Gaussian quadrature has been employed. More recently an alternative technique has been proposed and is described in UK Patent Specification No. 1503852. When using this alternative technique we have found that four chords (ie. paths) are sufficient to obtain errors less than one percent.

The invention will be further described with reference to the accompanying drawings in which:

FIGS. 5 and 6 are plots of flow velocity against deviation for pressures of 50 and 25 bar.

FIG. 7a is a schematic representation of pipework for testing disturbed flow and FIGS. 7b and 7c sectional views of disturbance plates for 'jetting' and 'swirl' respectively.

FIGS. 8a, 8b and 8c are plots of flow velocity against deviation with the source of disturbance 16, 8.5 or 4.5 diameters upstream of the testing point respectively.

Figure 1:
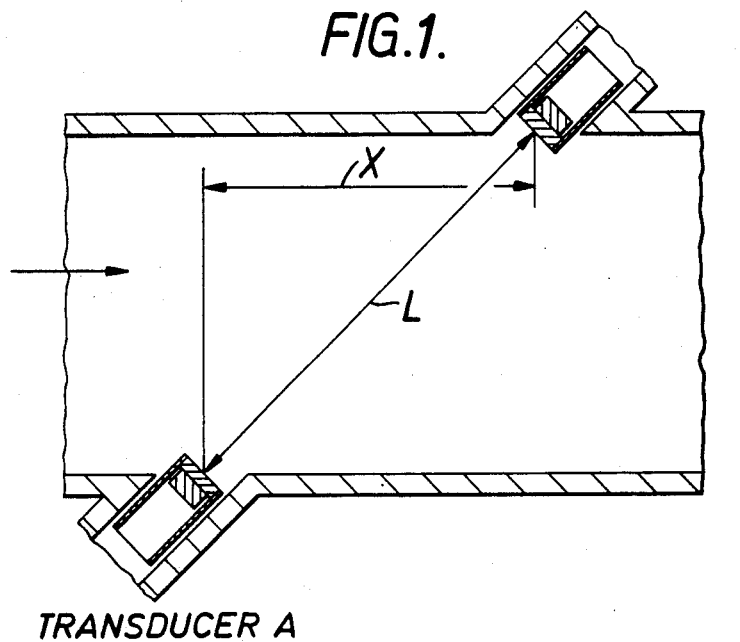
FIG. 1 is a schematic representation of a section of pipe or spool containing one pair of transducers, defining one path.
Figure 2:
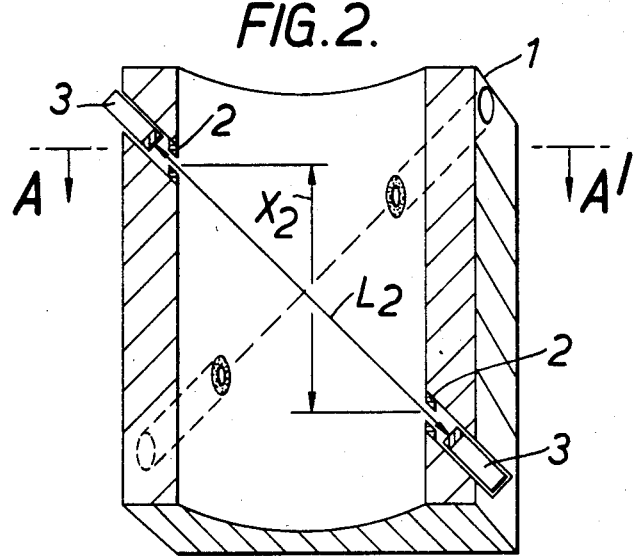
FIG. 2 is a schematic cross-section of a spool showing two of the four-path (chord) orientions of transducer pairs, in accordance with the invention.
Figure 2A:
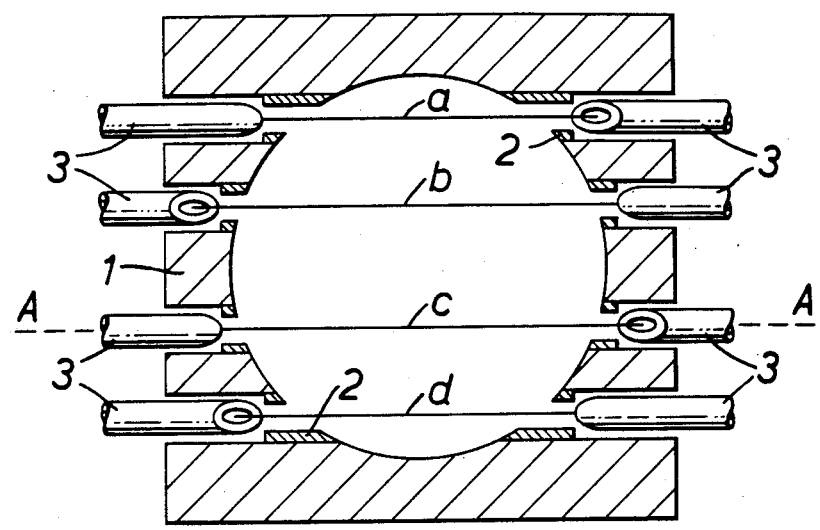
FIGS. 2a and 3a represent alternative representations of spool design.
Figure 3:
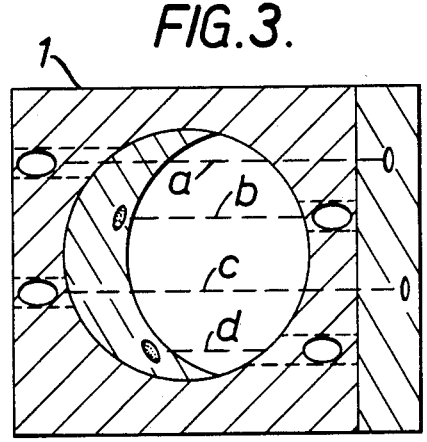
FIG. 3 is a schematic sectional plan view of the spool through the line A—A in FIG. 2.
Figure 3A:
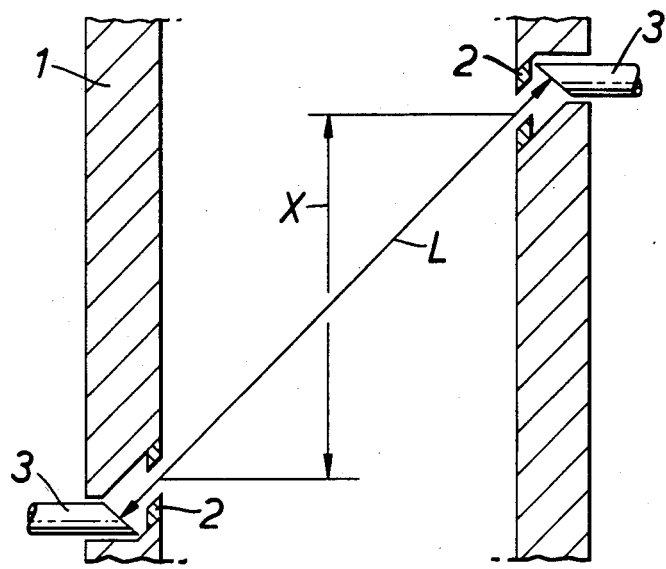
Figure 4:
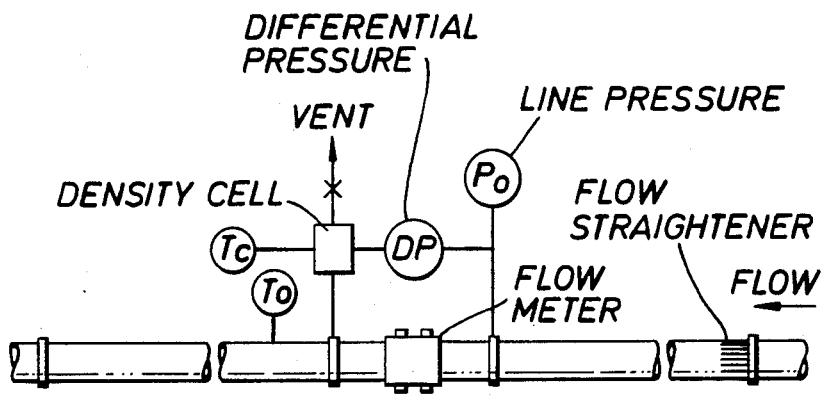
FIG. 4 is a schematic representation of the pipework layout employed for testing the flow meter in accordance with the invention.

Referring to FIGS. 2 and 3, a section of pipe wall or spool 1, is provided with four pairs of apertures or ports, the line or path between each pair defining a chord a,b,c,d, cutting the cross-section of the pipe interior. The apertures of each pair are longitudinally displaced by distance X, with respect to each other. Within each aperture is located an insert 2, shaped to fit the pipe bore. Also located within the aperture, are sealed transducers 3. Each transducer is set back from the gas flow so as not to disturb it and the transmitting/receiving face is aligned so as to be parallel to its counterpart. The distance between each face is defined by L.

The inserts effectively restrict the area of the ports thereby to reduce flow disturbances. They may optionally be designed to hold screens, for example made of nickel mesh, flush with the pipe wall. The screens which are transparent to ultrasound also minimize flow disturbance and restrict gas flow into the ports.

It should be noted that the theory presented previously can be extended to show that equation (5) is still valid with the transducers set back, providing X and L are defined as shown in FIG. 2.

A multiplex unit is used to select the connections of the ultrasonic drive/detection unit to each pair of probes in turn. The trigger pulses marking the beginning and end of each transit time are used to control the timer unit which operates from a 100 MHz clock. A microprocessor-based unit is used to check that each pair of transit times is reasonable, and to reject any for which there is a sudden change in the value of $$\left[ \frac{T_{AB} + T_{BA}}{2L} \right]$$

This would imply an impossibly sudden change in the velocity of sound. The microprocessor also computes the mean gas velocity, usually averaging over a 12 second period during which 200 measurements are made on each chord. The results are transferred to another unit for further analysis and are displayed or stored depending on the tests being performed. The number of rejections is displayed to give a clear indiction of the reliability of the meter operation.

The absolute accuracy of measurements from the meter depends on the measurement of the spool geometry as well as timing and integration accuracy. The chord height, cross-sectional area of the meter tube and dimension L can be measured with suitable accuracy fairly easily. The dimension X (shown on FIG. 2) is much more difficult to measure as it is not mechanically defined. However, with the help of special jigs it is possible to measure it to within approximately $+0.2\%$ on each of the four chords. The timing, defined by the crystal clock, is even more accurate and the integration should normally be within $+1\%$.

A second series of tests were designed to investigate the performance of the meter when installed near a source of flow disturbance. Three sources of flow disturbance were tested and are referred to as "bend", "jetting" and "swirl". "Bend" was a standard 90° elbow (with bend radius of 1.5 pipe diameters) in the horizontal plane. For "jetting" flow a plate with a semi-circular cut-out was added immediately upstream of the bend so it blocked half the pipe area on the inside of the bend. This simulated a half-closed gate valve upstream of the bend. "Swirl" was similar but the plate was rotated to block the bottom half of the pipe. This simulated the effect of two bends in different planes, and generated some swirl in the flow.

Measurements were made with the meter at three different distances ($4\frac{1}{2}$, $8\frac{1}{2}$ and 16 pipe diameters) downstream of the source of flow disturbance as shown in FIG. 7. Two different orientations of the meter were also examined, normally the meter had horizontal chords (in the plane of the bend) but some measurements were made with the chords vertical. In all the installation tests the meter was used with inserts and screens.

To enable the large number of combinations to be examined in a reasonable time we restricted measurements to a single pressure (nominally 43 bar) and usually to two flow rates (6 and 18 m/s) with just two measurements under each set of conditions.

The results are shown in FIG. 8. Duplicated measurements have been averaged before plotting for the sake of clarity. With the meter either 16 or 8½ diameters from the source of flow disturbance the meter performance was not seriously degraded and all the results were within a 1% band centred on a deviation of approximately −0.3%. When the meter was only 4½ diameters from the bend the performance was still similar to that quoted above at the lower velocities (usually 6 m/s) but deteriorated significantly when the velocity was increased to 18 m/s, especially for "jetting" or swirling" flows. At this velocity the deviations varied between 0 and −4.5%, probably because the detected signal was so weak that a significant proportion of the transit times were rejected. The extremely severe turbulence generated near the bend caused high signal attenuation and wide variations in the transit time. The flow profiles did not change much between flows of 6 and 18 m/s so errors from the integration are not likely to have been significant.

The results of these tests are also extremely satisfactory. They show that the meter was able to measure extremely distorted flows with good accuracy, the readings were within a band of 1% but this was offset slightly (to −0.3%). There is no way of telling whether this is due to the integration or to a systematic effect similar to that observed in the first series of tests. The relatively poor performance observed at the highest velocity is attributed to the very weak signals. The poor reliability of readings under these conditions would be obvious to any operator from the very high numbers of rejections.

The apparatus in accordance with the invention possesses the following advantages:

(i) The meter is accurate (+1% without individual calibration).

(ii) It maintains its accuracy even in distorted gas flows so it can be used in compact installations.

(iii) It is accurate over a very wide flow-range (100:1)

(iv) Its calibration is fixed on manufacture and has a theoretical basis.

(v) It can be serviced and the probes can be changed without the flow being stopped.

(vi) It uses stable digital timing techniques which are not prone to drifting and are easy to check.

(vii) It causes no blockage to the flow and generates no pressure loss.

(viii) It gives information on the velocity of sound in the gas.

(ix) It can measure dirty, pulsing and bi-directional flows.

(x) It is very adaptable as it is microprocesser-based.

(xi) It should be relatively cheap, especially for large pipes. An analysis of possible savings suggests that it may be cheaper to install than orifice plate meters for all sizes above 200 mm diameter. The savings for large meters would be very substantial, and it is estimated that a 900 mm ultrasonic meter could be only 20% of the cost of an orifice system.

We claim:

1. Apparatus for the measurement of fluid flow through a conduit comprising:
   a plurality of transducer pairs mounted in the conduit, each member of the pair cooperating with the other transducer of the pair to transmit and receive a beam of ultrasonic energy along a pathway therebetween, all of said pathways being angularly disposed with respect to the direction of the flow of the fluid through the conduit,
   said pathways being arranged in at least two groups of at least two pathways to each group,
   the pathways of a first of said groups being parallel to each other and coplanar in a first plane,
   the pathways of a second of said groups being parallel to each other and coplanar in a second plane,
   said first and second planes intersecting each other in the conduit, with all of said pathways being spaced from each other along the intersection of the planes, each of the two said planes intersecting each side of the conduit upstream and downstream, respectively, relative to the said intersection of the planes,
   and wherein the planes through each of said pathways which are perpendicular to said first and second planes are all parallel to each other.

2. An apparatus according to claim 1, said conduit being of circular cross section and having a central axis, said apparatus consisting of two groups, each group consisting of two pathways, and the said intersection of the planes passing through the axis of the conduit.

3. An apparatus according to claim 2, wherein the two pathways of each group are of dissimilar length to each other, but each pathway is equal in length to a pathway of the other group.

4. An apparatus according to claim 1, each transducer being recessed within the wall of the conduit.

5. An apparatus according to claim 4, including a screen transparent to ultrasonic energy covering the recess and flush with the inside wall of the conduit.

6. Apparatus for the measurement of fluid flow through a conduit comprising:
   a plurality of transducer pairs mounted in the conduit, each member of the pair cooperating with the other transducer of the pair to transmit and receive a beam of ultrasonic energy along a pathway therebetween, all of said pathways being angularly disposed with respect to the direction of flow of the fluid through the conduit,
   said pathways being arranged in at least two groups of at least two pathways to each group,
   the pathways of a first of said groups being parallel to each other and coplanar in a first plane,
   the pathways of a second of said groups being parallel to each other and coplanar in a second plane,
   said first and second planes intersecting each other in the conduit, with all of said pathways being spaced from each other along the intersection of the planes,
   one of the pathways of the first group being of a first length which is equal in length to one of the pathways of the second group,
   another of the pathways of the first group being of a second length which is equal in length to another of the pathways of the second group,
   the first and second lengths being different from each other.

7. An apparatus according to claim 6, the said conduit being of circular cross section and having a central axis, the pathways of the first length being located closer to the wall of the conduit than are the pathways of the second length.

8. An apparatus according to claim 7, consisting of two pathways in each group, and said intersection passing through the said axis of the conduit.

9. An apparatus according to claim 6, each transducer being recessed within the wall of the conduit.

10. An apparatus according to claim 9, including a screen transparent to ultrasonic energy covering the recess and flush with the inside wall of the conduit.

11. Apparatus for the measurement of fluid flow through a conduit comprising:
   a plurality of transducer pairs mounted in the conduit, each member of the pair cooperating with the other transducer of the pair to transmit and receive a beam of ultrasonic energy along a pathway therebetween, all of said pathways being angularly disposed with respect to the direction of flow of the fluid through the conduit,
   said pathways being arranged in at least two groups of at least two pathways to each group,
   the pathways of a first of said groups being parallel to each other, and coplanar in a first plane,
   the pathways of a second of said groups being parallel to each other and coplanar in a second plane,
   said first and second planes intersecting each other in the conduit, with all of said pathways being spaced from each other along the intersection of the planes,
   wherein the pathways within each group are of different lengths from each other.

12. An apparatus according to claim 11, said conduit being of circular cross section and having central axis, said apparatus consisting of two groups, each group consisting of two pathways, and the said intersection of the planes passing through the axis of the conduit.

13. An apparatus according claim 11, each transducer being recessed within the wall of the conduit.

14. An apparatus according to claim 13, including a screen transparent to ultrasonic energy covering the recess and flush with the inside wall of the conduit.

15. A method of measuring the flow of a gas through a conduit, comprising the following steps:
   directing pulses of ultrasonic energy along at least four pathways which extend across the conduit,
   the pathways being arranged in two groups of at least two pathways to a group,
   the pathways of the first group being parallel to each other and coplanar in a first plane and the pathways of the second group being parallel to each other and coplanar in a second plane, the first and second planes intersecting each other in the conduit with all of the pathways being spaced from each other along the intersection of the planes and each of the two set planes intersecting each side of the conduit upstream and downstream, respectively, of the intersection of the planes, and the planes through each of said pathways which are perpendicular to said first and second planes all being parallel to each other,
   detecting the transit times of the pulses,
   and ascertaining the mean gas velocity from said transit times.

16. The method of claim 15, including directing pulses in both directions along each of said pathways.

17. The method of claim 15, said detecting step including ascertaining whether each transit time is within a predetermined reasonable range, and noting the frequency of rejected readings outside of said range.

18. A method of measuring the flow of a gas through a conduit, comprising the steps of:
   directing pulses of ultrasonic energy along at least four pathways which extend across the conduit, the pathways being arranged in two groups of two pathways to a group, the pathways of the first group being parallel to each other and coplanar in a first plane while the pathways of the second group are parallel to each other and coplanar in a second plane, the first and second planes intersecting each other within the conduit, with all of the pathways spaced from each other along the intersection of the planes, and
   wherein the pathways within each group are of different lengths from each other,
   detecting the transit times of the pulses, and ascertaining the mean gas velocity from said transit times.

19. A method according to claim 18, including directing pulses in both directions along each of said pathways.

20. A method according to claim 18, said detecting step including ascertaining whether each transit time is within a predetermined reasonable range, and noting the frequency of rejected readings outside of said range.

21. A method according to claim 18, wherein one of the pathways of the first group is of a first length which is equal in length to one of the pathways of the second group while another of the pathways of the first group is of a second length which is equal in length to another of the pathways of the second group, and wherein the first and second lengths are different from each other.

* * * * *